US010742082B2

(12) United States Patent
Maki-Ontto et al.

(10) Patent No.: US 10,742,082 B2
(45) Date of Patent: Aug. 11, 2020

(54) FIXATION SYSTEM FOR A PERMANENT MAGNET ROTOR

(71) Applicant: INGERSOLL-RAND COMPANY, Davidson, NC (US)

(72) Inventors: Petri J Maki-Ontto, Espoo (FI); Fredrik Boxberg, Espoo (FI); Esa H Vikman, Espoo (FI)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 285 days.

(21) Appl. No.: 14/974,540

(22) Filed: Dec. 18, 2015

(65) Prior Publication Data

US 2016/0190883 A1 Jun. 30, 2016

Related U.S. Application Data

(60) Provisional application No. 62/098,538, filed on Dec. 31, 2014.

(51) Int. Cl.
*H02K 1/28* (2006.01)
*H02K 1/27* (2006.01)

(52) U.S. Cl.
CPC .............. *H02K 1/278* (2013.01); *H02K 1/28* (2013.01)

(58) Field of Classification Search
CPC .................................. H02K 1/278; H02K 1/28
USPC ..................................................... 310/156.19
See application file for complete search history.

(56) References Cited

U.S. PATENT DOCUMENTS

| 2,985,779 | A | * | 5/1961 | Flaningam | H02K 1/278 310/156.18 |
| 4,219,752 | A | * | 8/1980 | Katou | H02K 1/2786 310/153 |
| 4,549,341 | A | * | 10/1985 | Kasabian | H02K 1/278 29/598 |
| 4,625,135 | A | * | 11/1986 | Kasabian | H02K 1/278 29/598 |
| 4,855,630 | A | * | 8/1989 | Cole | H02K 1/278 310/156.28 |
| 4,920,634 | A | * | 5/1990 | Cole | H02K 1/278 29/598 |
| 5,140,210 | A | * | 8/1992 | Shirakawa | H02K 1/278 310/156.28 |
| 6,025,665 | A | * | 2/2000 | Poag | H02K 1/278 310/68 B |

(Continued)

*Primary Examiner* — Alex W Mok
(74) *Attorney, Agent, or Firm* — Taft Stettinius & Hollister LLP

(57) ABSTRACT

A fixation system that is structured to secure one or more permanent magnets to a rotor core. The fixation system may include one or more retention wedges that exert an interference or press fit against the permanent magnets to secure the permanent magnets to the rotor core. At least a portion of the retention wedges may be secured within axially extending channels in the rotor core. Additionally, the permanent magnets may be separated from each other by eddy current shields, which may also be retained in position by the retention wedges. The fixation system may also include a magnet pressure or fixation sleeve that exerts a radially inwardly directed force against the magnets and is free from direct contact with the retention wedges. According to certain embodiments, the magnet pressure or fixation sleeve may be shrink fitted onto at least a portion of the rotor core and/or the permanent magnets.

14 Claims, 7 Drawing Sheets

(56) References Cited

U.S. PATENT DOCUMENTS

| | | | |
|---|---|---|---|
| 6,078,121 A * | 6/2000 | Poag | H02K 1/278 29/596 |
| 6,548,932 B1 | 4/2003 | Weiglhofer et al. | |
| 6,700,242 B2 | 3/2004 | Kawamura | |
| 6,933,645 B1 | 8/2005 | Watson | |
| 7,285,890 B2 * | 10/2007 | Jones | H02K 1/278 310/156.16 |
| 7,692,348 B2 | 4/2010 | Gruenhagen | |
| 8,084,910 B2 * | 12/2011 | Silander | H02K 1/276 310/156.03 |
| 8,304,948 B2 | 11/2012 | Lantto et al. | |
| 8,339,005 B2 * | 12/2012 | Rebollo Gomez | H02K 1/278 310/156.18 |
| 8,487,496 B2 | 7/2013 | Ifrim et al. | |
| 8,593,029 B2 | 11/2013 | Inoue et al. | |
| 8,937,398 B2 * | 1/2015 | Casazza | H02K 1/2773 290/44 |
| 2003/0011267 A1 * | 1/2003 | Vollmer | H02K 1/2766 310/162 |
| 2005/0184611 A1 * | 8/2005 | Rinholm | H02K 1/278 310/156.21 |
| 2008/0143207 A1 * | 6/2008 | Shah | H02K 1/146 310/156.08 |
| 2010/0117473 A1 | 5/2010 | Masoudipour et al. | |
| 2013/0106207 A1 | 5/2013 | Song et al. | |
| 2013/0257211 A1 * | 10/2013 | Haga | H02K 1/278 310/156.12 |
| 2014/0084731 A1 * | 3/2014 | Iwami | H02K 1/278 310/156.07 |
| 2014/0145547 A1 * | 5/2014 | Nakano | H02K 21/16 310/216.069 |
| 2014/0191628 A1 * | 7/2014 | Nakano | H02K 1/2746 310/68 B |

\* cited by examiner

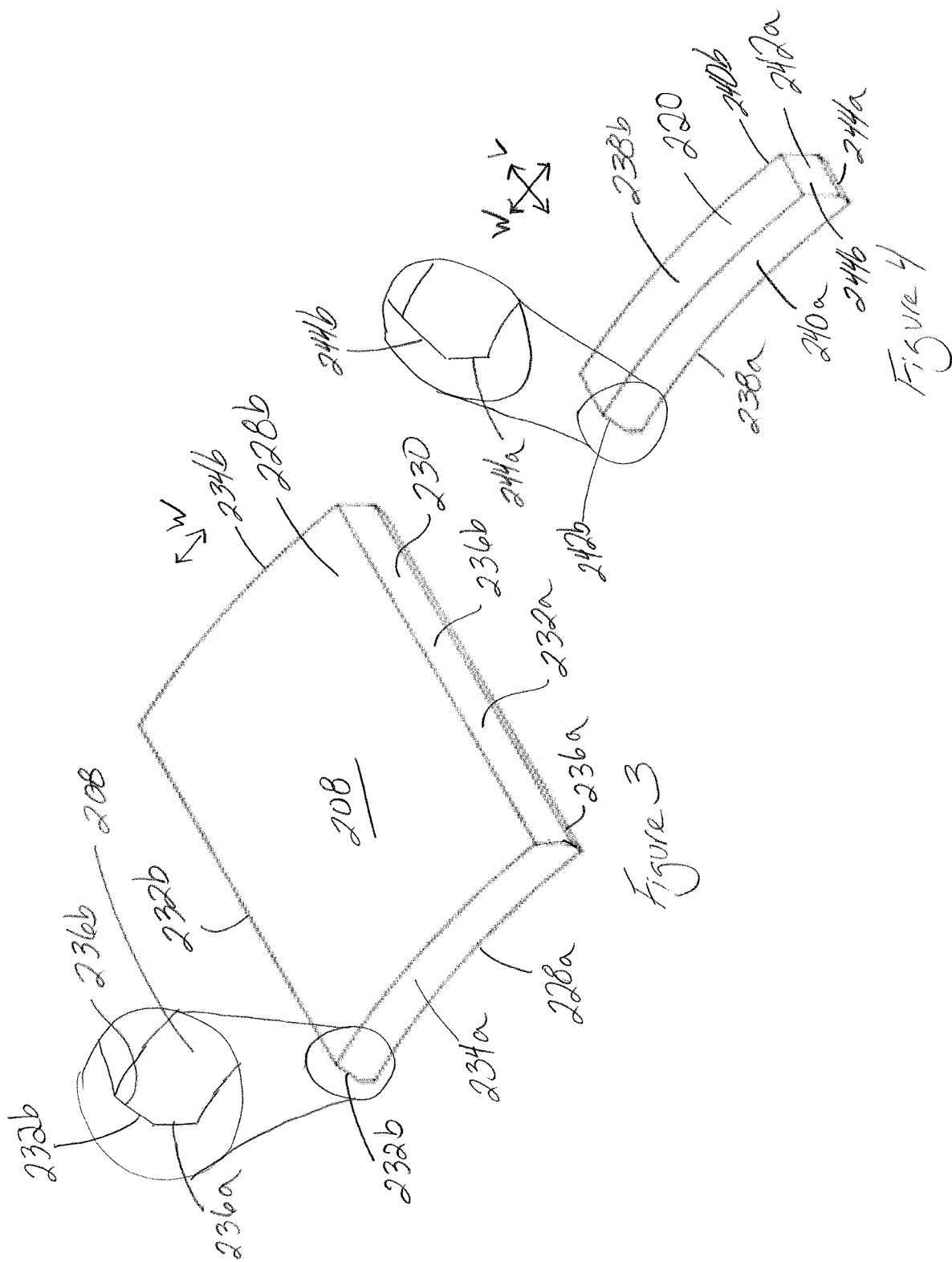

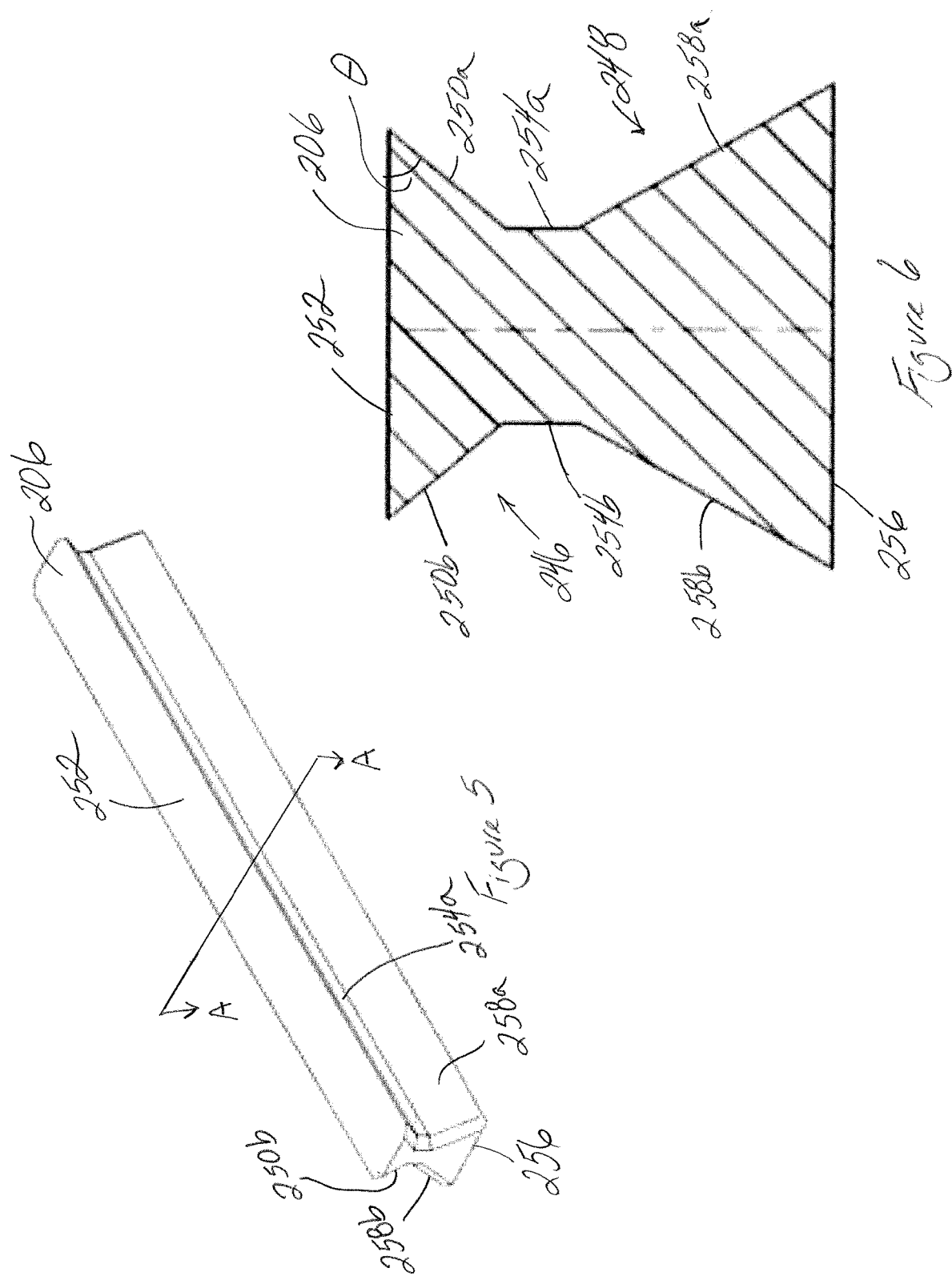

FIXATION SYSTEM FOR A PERMANENT MAGNET ROTOR

CROSS REFERENCE TO RELATED APPLICATIONS

The present application claims the benefit of U.S. Provisional Patent Application Ser. No. 62/098,538, filed Dec. 31, 2014, which is incorporated herein by reference in its entirety.

BACKGROUND

Embodiments of the present application generally relate to permanent magnet motors. More particularly, but not exclusively, embodiments of the present application relate to mechanical fixation of permanent magnets within a rotor construction for high speed permanent magnet motors.

Adhesives, including epoxy adhesives, are often utilized to secure magnets to the rotors of high speed permanent magnet motors. Yet, the process of securing magnets to rotors via use of adhesives may be relatively time consuming and laborious, and thus expensive. For example, adhesives typically require a hardening or curing time, such as, for example, a hardening period of around 24 hours. Additionally, the adhesive layer that forms underneath and/or between the magnets may adversely impact the quality of the rotor surface, and thereby necessitate the additional step, and associated time and expense, of grinding the magnet surfaces. Adhesives may also be inappropriate and/or unreliable in at least some high speed applications. For example, the bonding strength provided by a cured adhesive may be insufficient to withstand, or otherwise be compromised when subjected to, the forces generated by repeated, relatively high velocity rotational displacement of the rotor.

Additionally, eddy current shields are typically not utilized in permanent magnet rotor applications, as the relatively high temperatures generated by eddy currents are often controlled through the use of coolant solutions and/or may be withstood by the use of relatively high thermal load materials in the construction of permanent magnet rotors. Yet, the inclusion of coolant systems and use of high thermal load materials can increase the complexity and/or the cost of systems that utilize permanent magnet rotors. Additionally, similar to the magnets, eddy current shields, if used, are typically secured to the rotor via an adhesive or screws. Yet, eddy current shields that are secured to a rotor via an adhesive may suffer from the same reliability issues as magnets, particularly in high motor speed applications. Further, securing eddy current shields to a rotor with screws may further increase the time and effort involved in the construction of the rotor, and thereby further elevate the costs associated with rotor construction.

BRIEF SUMMARY

An aspect of the present application is an apparatus having at least one pair of retention wedges that are positioned adjacent to opposing sides of one or more magnets, the at least one pair of retention wedges being secured to a rotor core. Additionally, the at least one pair of retention wedges exert a force against opposing sides of the one or more magnets to retain a position of the one or more magnets about the rotor core. The apparatus also includes a magnet pressure sleeve that is positioned radially outwardly of, and against, the one or more magnets and which is separated from the at least one pair of retention wedges by a space.

Another aspect of the present application is an apparatus that includes a rotor that has a rotor core, one or more magnets, and a plurality of channels. The one or more magnets are positioned about at least a portion of an outer surface of the rotor core, while the plurality of channels extend axially through at least a portion of the rotor core. The apparatus also includes a plurality of retention wedges that are secured within the plurality of channels. Further, an engagement section of the plurality of retention wedges projects away from the plurality of channels through one or more openings in the outer surface of the rotor core. Additionally, the engagement section exerts a force against the one or more magnets to retain a position of the one or more magnets about the rotor core. The apparatus further includes a magnet pressure sleeve that is secured to the rotor core. The magnet pressure sleeve is also positioned radially outwardly of, and against, the one or more magnets and free from direct contact with the plurality of retention wedges.

A further aspect of the present application is an apparatus that includes a plurality of permanent magnets that have a first engagement wall, a second engagement wall, an inner wall, and an outer wall. The inner and outer walls are positioned on opposing sides of each magnet of the plurality of magnets, and at least a portion of the inner wall abuts against an outer surface of a rotor core. The apparatus further includes a first retention wedge that has a first engagement portion and a second engagement portion, the second engagement portion of the first retention wedge being secured within an axially extending first channel of the rotor core. The first engagement portion of the first retention wedge extends to an outer wedge wall of the first retention wedge and exerts a pressing force against the first engagement wall of the plurality of permanent magnets. The apparatus further includes a second retention wedge having a first engagement portion and a second engagement portion. The second engagement portion of the second retention wedge is secured within an axially extending second channel of the rotor core. The first engagement portion of the second retention wedge extends to an outer wedge wall of the second retention wedge and exerts a pressing force against the second engagement wall of the plurality of permanent magnets. Additionally, the outer wedge walls of the first and second retention wedges are separated from the rotor core by a radial distance that is less than a radial distance separating the outer surface of the plurality of permanent magnets and the rotor core.

BRIEF DESCRIPTION OF THE DRAWINGS

The description herein makes reference to the accompanying figures wherein like reference numerals refer to like parts throughout the several views.

FIG. 3 illustrates a side perspective view of a permanent magnet according to an illustrated embodiment of the present application.

FIG. 4 illustrates a side perspective view of an eddy current shield according to an illustrated embodiment of the present application.

FIG. 5 illustrates a side perspective view of a retention wedge according to an illustrated embodiment of the present application.

FIG. 6 illustrates a cross sectional view of a retention wedge taken along line A-A of FIG. 5.

Figure 1:
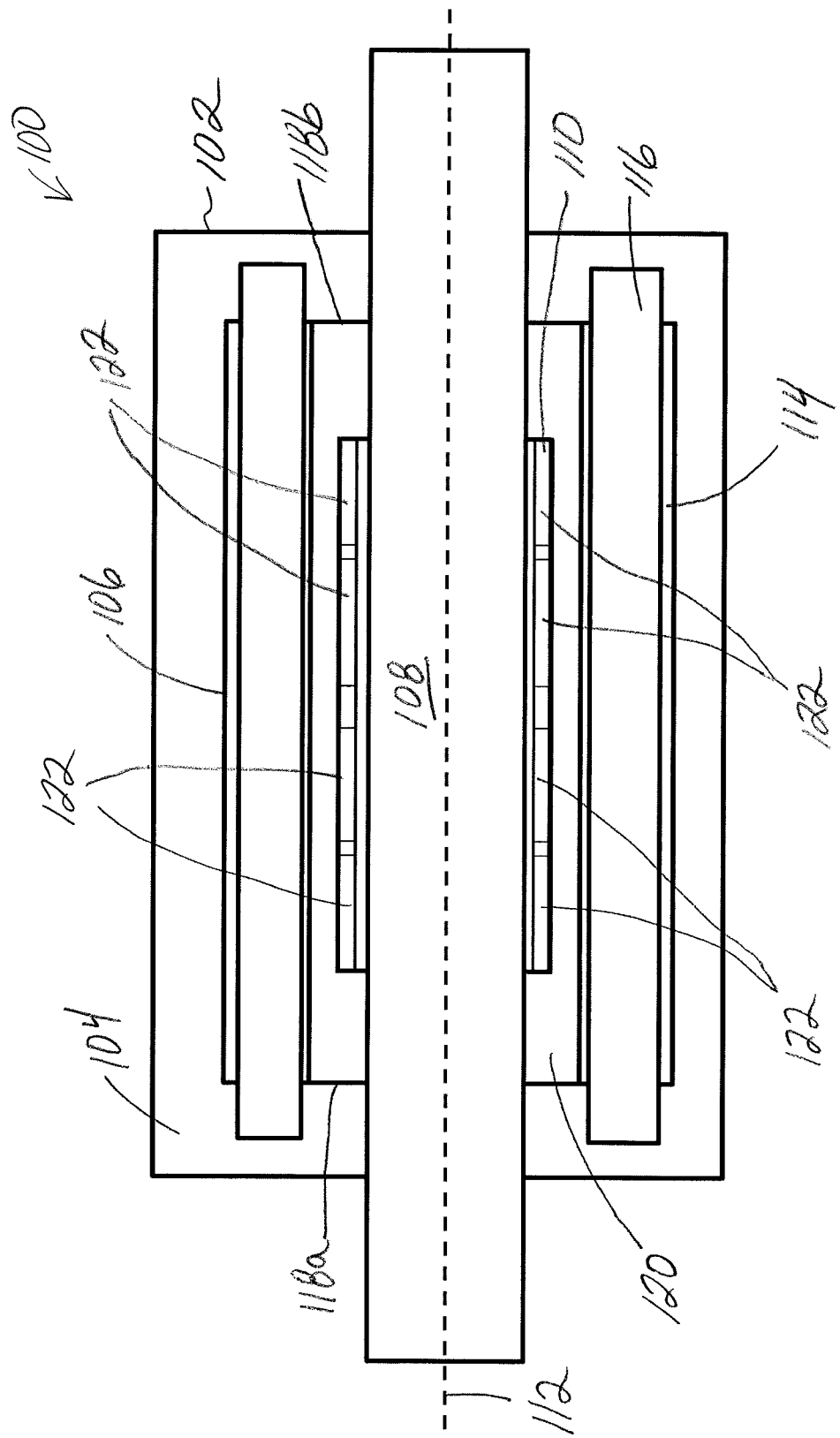
FIG. 1 illustrates a schematic of certain aspects of a non-limiting example of an electrical machine according to an embodiment of the present application.

The foregoing summary, as well as the following detailed description of certain embodiments of the present application, will be better understood when read in conjunction with the appended drawings. For the purpose of illustrating the invention, there is shown in the drawings, certain embodiments. It should be understood, however, that the present application is not limited to the arrangements and instrumentalities shown in the attached drawings.

DESCRIPTION OF THE ILLUSTRATED EMBODIMENTS

FIG. 1 illustrates some aspects of a non-limiting example of an electrical machine 100 according to an embodiment of the present application. In one form, the electrical machine 100 is a synchronous machine, such as, for example, a permanent magnet machine, including a permanent magnet motor, generator, or motor/generator, among other electrical machines. In the illustrated embodiment, the electrical machine 100 includes a housing 102 that generally defines an inner region 104 of the electrical machine 100. The inner region 104 may have a variety of different shapes and configurations, including, for example, being generally cylindrical. Additionally, the inner region 104 may be configured to house a variety of components of the electrical machine 100. For example, according to certain embodiments, the inner region 104 is configured to house a stator 106 and at least a portion of a rotatable shaft 108 that is operably mounted to a rotor 110. Further, the rotatable shaft 108 and rotor 110 rotate about an axis of rotation 112.

The stator 106, which may be supported or otherwise affixed within the inner region 104 of the housing 102, may include a stator yoke 114 and plurality of stator windings 116 that extend from opposing first and second ends 118a, 118b of the stator 106. The first and second ends 118a, 118b of the stator 106 may be spaced inwardly from opposite sides of the housing 102. Further, motor terminals may be connected to the windings 116 provided in stator 106. According to certain embodiments, the stator yoke 114 is formed of a plurality of laminations or sheets which may reduce the amount of electromagnetic losses, e.g., eddy current losses, for example, during rapid changes in current flow in windings 116. However, according to other embodiments, rather than being laminated, the stator yoke 114 may control or reduce eddy current losses in other manners, or may not employ means for controlling eddy current losses.

The stator yoke 114 may have a generally tubular configuration that generally defines a cavity 120 that receives at least a portion of the rotor 110. In one form, the stator yoke 114 circumferentially encompasses the rotor 110, although in other embodiments the stator yoke 114 may only partially encompass the rotor 110. The rotor 110 is configured for electromagnetic cooperation with the stator 106, e.g., to convert electrical power into mechanical power for delivery via rotational displacement of the shaft 108 in some embodiments and/or to convert mechanical power received from the shaft 108 into electrical power for delivery via the stator 106 in other embodiments. Further, according to certain embodiments, the stator yoke 114 may be operably connected to one or more magnets.

According to certain embodiments, portions of the shaft 108 function as the rotor 110. In other embodiments, the rotor 110 may be separate and distinct from shaft 108, e.g., the rotor 110 may be attached to, mounted on, or otherwise coupled to the shaft 108. Additionally, the shaft 108 may be solid or hollow. Further, the rotor 110 includes a plurality of permanent magnets 122. In the illustrated embodiment, magnets 122 are configured as surface permanent magnets that are positioned about the circumference of the rotor 110. The rotor 110 may be constructed using the permanent magnets 122 in such a way so as to provide an essentially constant magnetic flux at the surface of the rotor 110.

Figure 2:
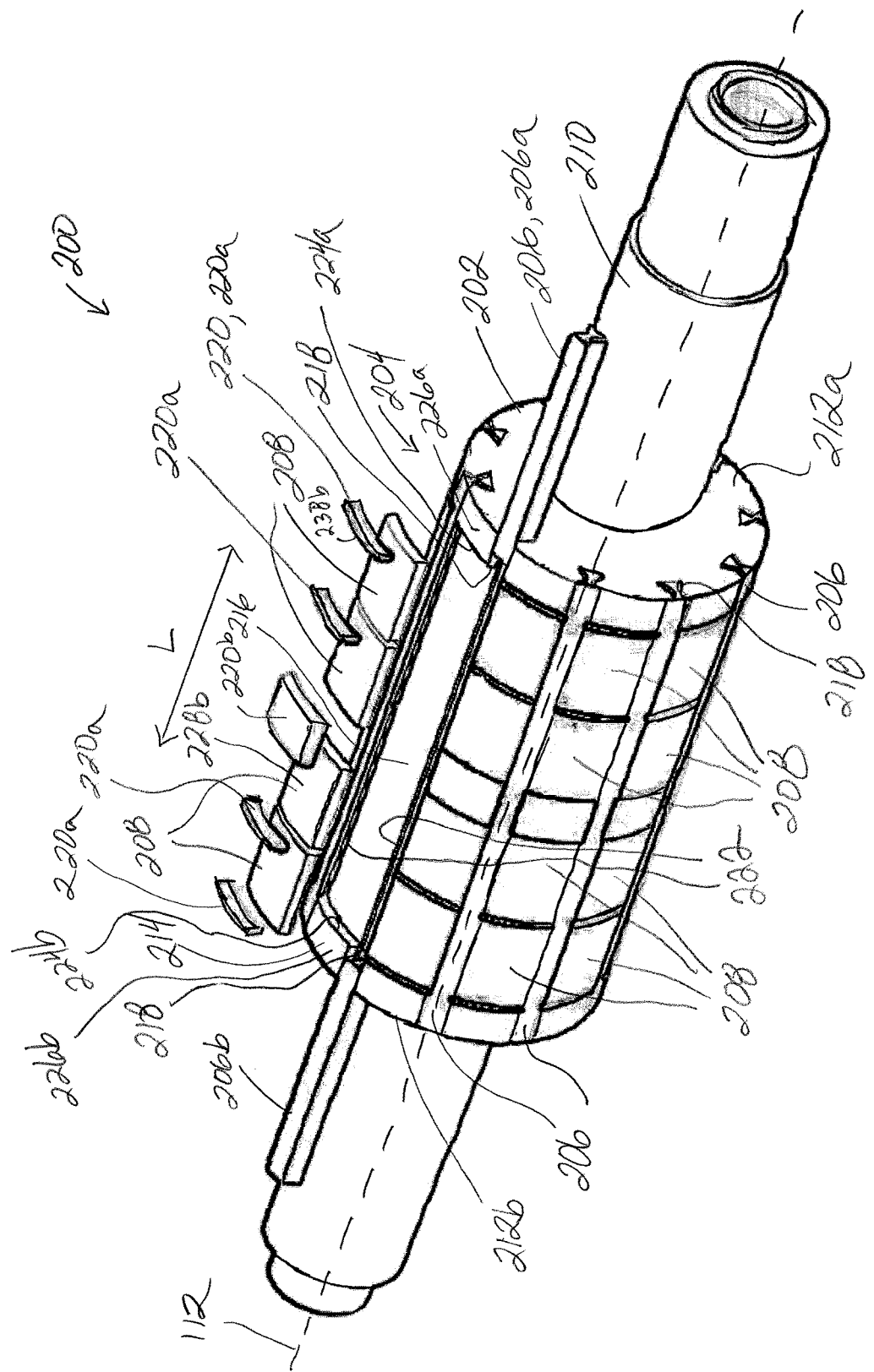
FIG. 2 illustrates a side perspective view of a rotor having a permanent magnet rotor and a fixation system according to an illustrated embodiment of the present application.

FIG. 2 illustrates a side perspective view of a permanent magnet rotor 200 that includes a rotor core 202 that is secured to, or part of, a shaft 210, and which includes a fixation system 204 that is structured to secure one or more magnets 208 to the rotor core 202. According to certain embodiments, the fixation system 204 includes one or more retention wedges 206 and at least one or more magnets 208, the retention wedges 206 being structured to matingly engage at least one surface of an adjacent magnet 208 in a manner that facilities the mechanical fixation of the magnet 208 to the rotor core 202. For example, according to certain embodiments, the rotor core 202 may be constructed to receive secure placement of at least one retention wedge 206, the received retention wedge 206 engaging an adjacent magnet 208 that has been placed on or within a portion of the rotor core 202 such that an interference or press fit is provided between the retention wedge 206 and the magnet 208 that at least assists in retaining the magnet 208 in a positon relative to the rotor core 202. Further, the magnets 208 and retention wedges 206 may be arranged in an alternating pattern to form a radially outward circumference about at least a portion of the rotor core 202. Such a fixation system 204 may be configured to lockingly secure the magnet 208 to the rotor core 202 via a mechanical connection rather than through the use of an adhesive, and which retains the position of the magnets 208 about the rotor core 202 both before and during rotation of the rotor 200.

The rotor core 202 may include opposing first and second ends 212a, 212b. Additionally, the rotor core 202 may have an outer or circumferential surface 214 that extends between the opposing first and second ends 212a, 212b. Further, a plurality of channels 218 may extend through the rotor core 202, with at least a portion of the channels 218 extending through the outer surface 214 of the rotor core 202 so as to provide openings 222 in the outer surface 214. The channels 218 may each be configured to receive secure placement of one or more retention wedges 206. For example, as shown in FIG. 2, according to certain embodiments, one or more retention wedges 206a, 206b may be inserted, or pressed, into each end of the channel 218. According embodiments in which more than one retention wedge 206 is inserted into a channel 218, each retention wedge 206 may extend along only a portion of the channel 218. However, according to other embodiments, a single retention wedge 206 may be placed within at least some, if not all, of the channels 218. According to such embodiments, the retention wedges 206 may have a length that allows the retention wedges 206 to at least lockingly engage each adjacent magnet 208. Additionally, as discussed below, at least a portion of the retention wedges 206 that are positioned within the channels 218 may extend through the openings 222 in the outer surface 214 of the rotor core 202.

The operable placement of the retention wedges 206 in the channels 218 may lead to the formation of slots 216 about the rotor core 202 that are configured to retain placement of the at least one magnet 208 about the rotor core 202. Additionally, according to certain embodiments, the slots 216 may also be configured to receive placement of at least one eddy current shield 220. According to the illustrated embodiment, each slot 216 may be generally defined by opposing retention wedges 206 and inner surfaces 224a, 224b of opposing first and second end walls 226a, 226b of the rotor core 202. The first and second end walls 226a, 226b may be configured to prevent, or otherwise limit, axial displacement (as indicated by the "L" direction in FIG. 2) of the magnets 208 that are operably positioned within the slot 216. In the embodiment illustrated in FIG. 2, each slot 216 may be sized to accommodate four magnets 208 and five eddy current shields 220a, 220b. However, the number of magnets 208 and eddy current shields 220 positioned within each slot 216 may vary, and may be based on a number of different considerations, including, for example, the size and shape of the rotor core 202, magnets 208, eddy current shields 220, and retention wedges 206, among other considerations.

FIG. 3 illustrates a side perspective view of a magnet 208 according to an illustrated embodiment of the present application. The magnet 208 may have opposing inner and outer walls 228a, 228b and a sidewall 230. According to the illustrated embodiment, the inner and outer walls 228a, 228b may be generally curved to provide the magnet 208 with an arced or curved profile, as shown, for example, in at least FIGS. 3 and 7. Further, the curvature of the inner wall 228a may generally match a curved shaped of the adjacent portion of the outer surface 214 of the rotor core 202 that at least a portion of the inner wall 228a may abut or otherwise be positioned against. Additionally, according to the illustrated embodiment, the outer wall 228b of the magnet 208 may be generally parallel to the inner wall 228a such that the magnet 208 may generally have a uniform thickness between the inner and outer walls 228a, 228b.

The sidewall 230 of the magnet 208 may include opposing first and second longitudinal or engagement walls 232a, 232b, and opposing first and second transversal or abutment walls 234a, 234b. The abutment walls 234a, 234b are configured to abut against an adjacent magnet 208, eddy current shield 220, and/or the inner surface 224a, 224b of the first and second end walls 226a, 226b of the rotor core 202. Further, as shown by at least FIG. 3, the abutment walls 234a, 234b may generally extend along the arced or curved profile of the magnet 208. Additionally, the abutment walls 234a, 234b may have a variety of different shapes, configurations, and orientations. For example, in the illustrated embodiment, the abutment walls 234a, 234b have a relatively flat, planar configuration and are generally parallel to each other. However, according to other embodiments, the abutment walls 234a, 234b may have shapes and configurations that may assist in at least facilitating an interconnection or locking engagement between at least the abutment walls 234a, 234b of adjacent magnets 208 and/or one or more sidewalls of the eddy current shields 220.

At least a portion of the first and second engagement walls 232a, 232b of the magnet 208 are configured for a mating or locking engagement with at least a portion of a retention wedge 206 in a manner that facilities the mechanical fixation of the magnet 208 to the rotor core 202. For example, according to certain embodiments, the first and second engagement walls 232a, 232b may include a recess, cavity, or tapered surface such that, when operably engaged with a retention wedge 206, at least a portion of the retention wedge 206 extends over and/or into a portion of the magnet 208 at or in the vicinity of the first and second engagement walls 232a, 232b. Such configurations of the engagement walls 232a, 232b of the magnet 208 may provide an area or surface against which the retention wedge 206 may lockingly engage the magnet 208, such as, for example, by exerting a pressing force against the magnet 208 that at least assists in retaining against the rotor core 202.

Figure 7:
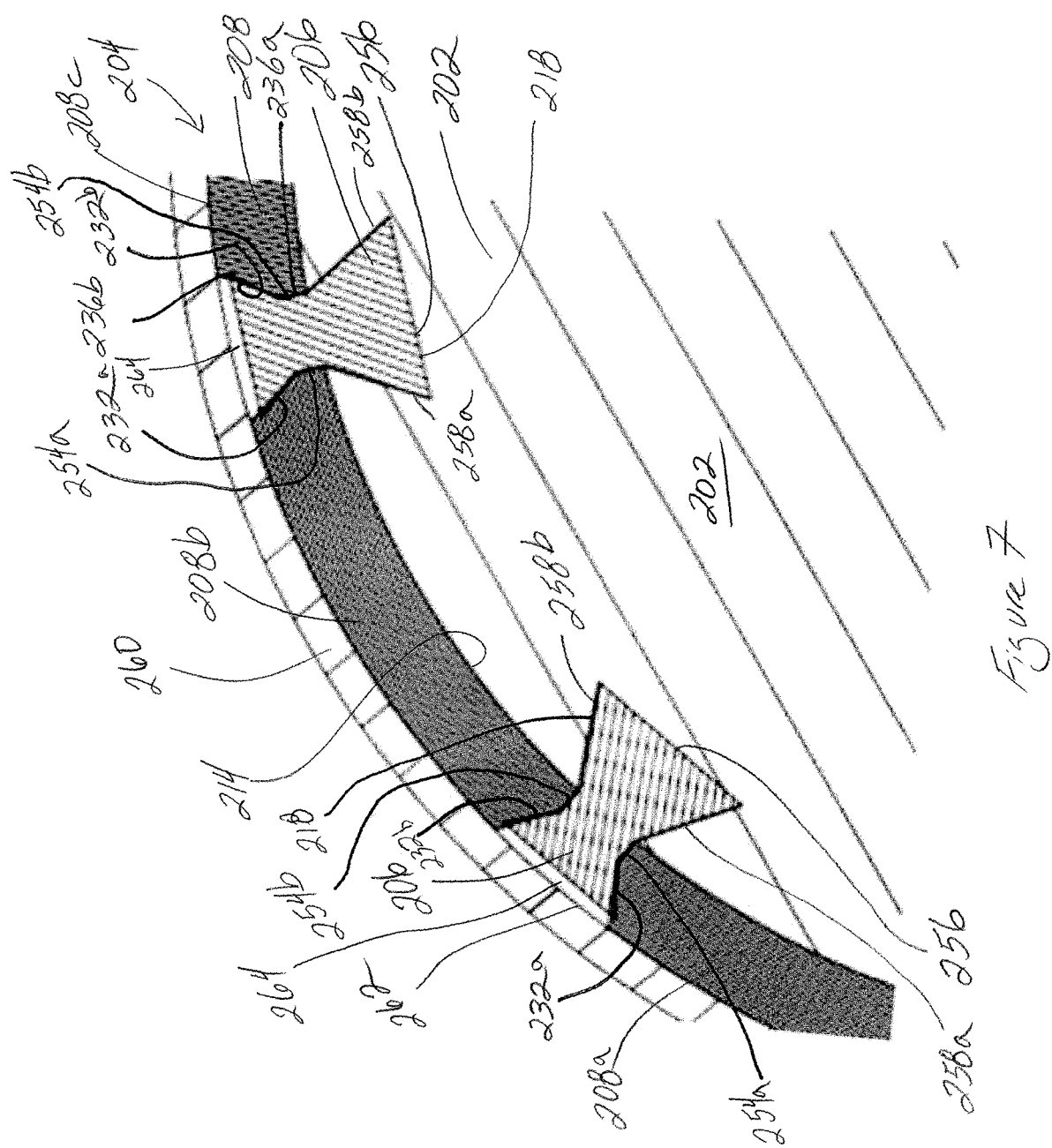
FIG. 7 illustrates a cross sectional view of a portion of the permanent magnet rotor shown in FIG. 1.

As shown in FIGS. 3 and 7, according to the illustrated embodiment, both the first and second engagement walls 232a, 232b have a first engagement portion 236a and a second engagement portion 236b. According to the illustrated embodiment, the first engagement portion 236a may extend between the inner wall 228a and the second engagement portion 236b, while the second engagement portion 236b may extend between the first engagement portion 236a and the outer wall 228b of the magnet 208. Moreover, according to certain embodiments, the first engagement portion 236a may extend from the inner wall 228a at around a 90° angle such that, when the magnet 208 is operably positioned against the rotor core 202, the first engagement portion 236a of the magnet 208 is generally perpendicular to the adjacent portion of the outer surface 214 of the rotor core 202. The second engagement portion 236b of the first and second engagement walls 232a, 232b is inwardly angled or tapered from the first engagement portion 236a and toward the outer wall 228b of the magnet 208. According to such an embodiment, the width across the outer wall 228b of the magnet 208 (in the "W" direction in FIG. 3) is less than a corresponding width across the inner wall 228a of the magnet 208. Moreover, according to such an embodiment, the second engagement portion 236b is configured to provide a surface against which at least a portion of the retention wedge 206 may engage to at least assist in retaining the magnet 208 at a position against the rotor core 202. Moreover, in the illustrated embodiment, the second engagement portion 236b provides a surface upon which a portion of the retention wedge 206 may exert a compressive force that presses the magnet 208 against or toward the rotor core 202.

As shown in at least FIGS. 2 and 4, according to certain embodiments, the fixation system 204 may include one or more eddy current shields 220. The eddy current shields 220 may be constructed from a variety of non-magnetic, electrically conductive materials, including, for example, aluminum or copper. Other factors may also be considered in the selection of the material for use for the eddy current shields 220, including, for example, the weight and elongation before fracture properties of the material, among other considerations.

The eddy current shields 220 may be configured such that, when used in connection with retention wedges 206, a short circuit cage is formed about a magnet 208 that reduces or eliminates current generation in the magnet 208. Moreover, such a configuration may reduce, minimize and/or eliminate the formation of eddy currents so as to increase the power density that may be generated by high speed operation of the electrical machine 100, and more specifically, operation of the rotor 200.

The eddy current shield 220 may have an inner shield surface 238a and an outer shield surface 238b that have similar shapes and configurations as the inner and outer walls 228a, 228b, respectively, of the magnets 208. For example, the inner and outer shield surfaces 238a, 238b may have an arced or curved shape or configuration that is similar to the arced or curved shape of the corresponding inner wall 228a and outer wall 228b of the magnets 208. Additionally, the eddy current shields 220 may have opposing first and second shield abutment walls 240a, 240b that are adapted to abut against at least a portion of a first or second abutment wall 234a, 234b of an adjacent magnet 208. While the first and second shield abutment walls 240a, 240b may have a variety of different configurations, in the illustrated embodiment, similar to the first or second abutment walls 234a, 234b of the magnet 208, the first and second shield abutment walls 240a, 240b of the eddy current shields 220 may be generally parallel to each other and have a relatively flat, planar configuration. Additionally, the first and second shield abutment walls 240a, 240b of the eddy current shields 220 may extend along a width of the eddy current shield 220 (as indicated by the "W" direction in FIG. 4) that is similar to the width that the first or second abutment walls 234a, 234b extend along the magnet 208 (as indicated by the "W" direction in FIG. 3).

The eddy current shields 220 may also include first and second longitudinal or shield engagement walls 242a, 242b that are generally perpendicular to at least a portion of the first and second shield abutment walls 240a, 240b. According to the illustrated embodiment, the first and second shield engagement walls 242a, 242b of the eddy current shields 220 may also have a shape or configuration that is similar to that of the first and second engagement walls 232a, 232b of the magnet 208 such that the eddy current shields 220 are engaged by a retention wedge 206 in the same or similar manner as the magnets 208. For example, in the depicted embodiment, the first and second shield engagement walls 242a, 242b of the eddy current shields 220 each include a first shield portion 244a and a second shield portion 244b that are similar to shape and/or orientation of the first and second engagement portions 236a, 236b, respectively, of the magnets 208. However, according to certain embodiments, the first and second shield engagement walls 242a, 242b of one or more of the eddy current shields 220 may have a length (as indicated by the "L" direction in FIGS. 2 and 4) that is different than a corresponding length of the first and second engagement walls 232a, 232b of the magnet 208. For example, in the embodiment shown in FIG. 2, in addition to the magnets 208, the slots 216 may also include five eddy current shields 220, with four of the eddy current shields 220a having a length along the first and second shield engagement walls 242a, 242b that is smaller than a corresponding length of a centrally located eddy shield 220b. However, according to other embodiments, each of the eddy current shields 220 may be generally uniform in length. Further, as shown in FIG. 2, according to the illustrated embodiment, each of the five eddy current shields 220a, 220b, which are each positioned between magnets 208, have a length along the first and second shield engagement walls 242a, 242b that is less than a corresponding length of the magnets 208. However, the number and size of eddy current shields 220 and/or magnets 208 may vary for different applications and/or different rotors.

FIGS. 5 and 6 illustrate a retention wedge 206 according to an embodiment of the present application. As shown, the depicted retention wedge 206 may include a first engagement section 246 and a second engagement section 248. The first engagement section 246 may be configured for a locking engagement with at least a magnet 208 in connection with the mechanical fixation of the magnet 208 to the rotor core 202, while the second engagement section 248 may be configured for engagement with a channel 218 in the rotor core 202. More specifically, according to the illustrated embodiment, the first engagement section 246 of the retention wedge 206 may extend through an opening 222 in the outer surface 214 of the rotor core 202 and be adapted to engage at least an engagement wall 232a, 232b of one or more magnets 208, as well as shield engagement walls 242a, 242b of eddy current shields 220.

In the illustrated embodiment, the first engagement section 246 includes one more wedge engagement surfaces 250a, 250b that are structured to at least abut against at least a portion of an adjacent first and/or second engagement wall 232a, 232b of one or more magnets 208 and at least a portion of the first and second shield engagement walls 242a, 242b of the eddy current shields 220. For example, according to certain embodiments, the first and second wedge engagement surfaces 250a, 250b may each inwardly extend from an outer wedge wall 252 at an angle (θ) of about 40° to 60°, and more particularly, at an angle of about 50°. According to such an embodiment, the angled configuration of the wedge engagement surfaces 250a, 250b, and corresponding mating shape or orientation of the magnets 208 and eddy current shields 220, at least assists in the ability of the retention wedge 206 to extend over, and/or into, at least a portion of the magnets 208 and eddy current shields 220 so that the retention wedge 206 may be position to exert a force on at least a portion of the magnets 208 and eddy current shields 220 that at least assists in retaining the position of the magnets 208 and eddy current shields 220 about the rotor core 202.

According to the illustrated embodiment, the first engagement section 246 may also include intermediary surfaces 254a, 254b on opposing sides of retention wedge 206. According to the illustrated embodiment, the intermediary surfaces 254a, 254b may be configured to mate with at least the first engagement portion 236a of the first and/or second engagement wall 232a, 232b of one or more adjacent magnets 208a-c, as illustrated, for example, in FIG. 7. Additionally, according to the illustrated embodiment, the intermediary surfaces 254a, 254b may provide a transition between the first and second engagement sections 246, 248 of the retention wedge 206. Further, the intermediary surfaces 254a, 254b may be configured to engage the first engagement portion 236a of the first or second engagement walls 232a, 232b and the first shield portion 244a of the first and second shield engagement walls 242a, 242b of the eddy current shields 220 in a manner that prevents, or limits, transversal displacement of the magnets 208 and the eddy current shields 220 between the retention wedges 206.

The second engagement section 248 may extend between the intermediary surfaces 254a, 254b of the first engagement section 246 and an inner wedge wall 256 of the retention wedge 206. Further, the second engagement section 248 of the retention wedge 206 may be configured to, in connection with the configuration of the channel 218, facilitate a locking engagement between the retention wedge 206 and the rotor core 202. For example, according to the illustrated embodiment, the second engagement section 248 of the retention wedge 206 may include opposing sidewalls 258a, 258b that are angled or tapered inwardly from the inner wedge wall 256 to the intermediary surfaces 254a, 254b of the first engagement section 246. According to such an embodiment, the channels 218 may have a similar mating configuration that provides the channel 218 with a tapered or dovetail shape. Moreover, as illustrated by at least FIGS. 2 and 7, the differences in widths between the inner wedge wall 256 and the intermediary surfaces 254a, 254b of the retention wedge 206, and the corresponding differences in widths between similar sections of the tapered or dovetail shaped channel 218, including the opening 222 in the outer surface 214 of the rotor core 202, assists in resisting displacement or removal of the retention wedge 206 from the channel 218 in a direction that is generally perpendicular to an axis of rotation 112 of the rotor 200. Thus, according to the illustrated embodiment, each retention wedge 206 may be operably positioned within a corresponding channel 218 by inserting the retention wedges 206 into the channel 218 at the first or second end 212a, 212b of the rotor core 202 in a direction that is generally parallel to the axis of rotation 112.

As previously discussed, the retention wedges 206 and/or channels 218 may be configured such that, when the retention wedges 206 are operably positioned in the channels 218, the retention wedges 206 lockingly secure the magnets 208 and eddy current shields 220 via an interference, friction, or otherwise pressing fit or connection. Thus, according to certain embodiments, the retention wedges 206 may be constructed from a non-magnetic, electrically conductive material that has plastic deformation characteristics that permit deformation of the retention wedges 206 to a degree that prevents cracking of at least the magnets 208 that are engaged by the retention wedges 206. For example, according to certain embodiments, the retention wedges 206 may be constructed from a generally soft aluminum that is capable of a attaining a relatively large degree of plastic deformation.

While the embodiments of the fixation system 204 discussed herein utilize angled surfaces of the magnets 208, eddy current shields 220, and retention wedges 206 to attain compressive forces that retain the position of the magnets 208 and eddy current shields 220 relative to the rotor core 202, a variety of other shapes and configurations may be utilized. For example, according to certain embodiments, the engagement walls 232a, 232b of the magnets 208 may include a recess that receives at least a protrusion of the retention wedge 206. Additionally, rather than having an angled wall, as shown in at least FIG. 3, the first and second engagement walls 232a, 232b may include a curved shape that inwardly and/or outwardly extends into/from the magnet 208. Further, according to certain embodiments, rather than having first and second engagement portions 236a, 236b, the engagement walls 232a, 232b of the magnet 208 may be adapted to provide one or more engagement surfaces, such as, for example, a single engagement surface that extends from the inner wall 228a to the outer wall 228b of the magnet 208. Additionally, according to certain embodiments, the shape, configuration, and/or orientation of the first engagement wall 232a may be different than that the second engagement wall 232b. According to such embodiments, the retention wedge 206 may also be similarly configured to attain mating engagements with the different shapes, configurations, and/or orientations of the first and second engagement walls 232a, 232b.

Figure 8:
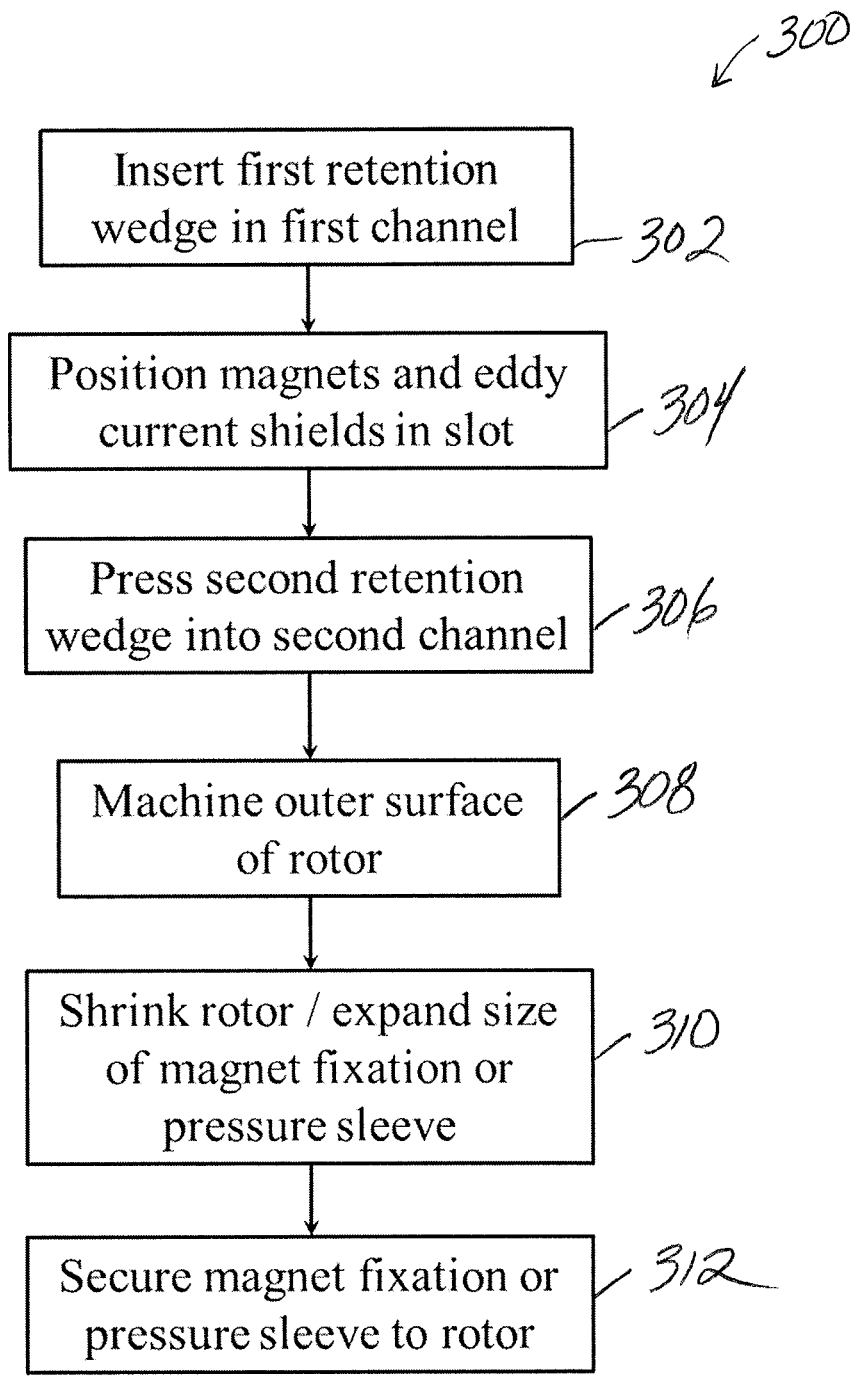
FIG. 8 illustrates a flow diagram of an exemplary process for installing a fixation system for a permanent magnet rotor according to an illustrated embodiment of the present application.

FIG. 8 illustrates a flow diagram of an exemplary process 300 for installing a fixation system 204 for a permanent magnet rotor 200 that at least facilitates the mechanical retention of magnets 208 to the rotor core 202. The steps illustrated herein are understood to be exemplary only, and steps may be combined or divided, and added or removed, as well as re-ordered in whole or in part.

At step 302, a first retention wedge 206 may be positioned within a first channel 218 in the rotor core 202. As previously discussed, each channel 218 may receive one or more retention wedges 206. Additionally, according to the illustrated embodiment, the retention wedge(s) 206 may be inserted into the channel 218 at the first or second ends 212a, 212b of the rotor core 202 in a direction that is generally parallel to the axis of rotation 112. At step 304, one or more magnets 208 may be positioned along the outer surface 214 of the rotor core 202, with at least a portion of the first engagement walls 232a of the magnets 208 abutting against a first wedge engagement surface 250a of the first retention wedge 206, as illustrated, for example, in FIG. 7. Additionally, according to certain embodiments, eddy current shields 220 may also be positioned between each of the magnets 208, as shown, for example, in FIG. 2, with the first shield engagement walls 242a of the eddy current shields 220 also abutting against an adjacent portion of the first wedge engagement surface 250a of the first retention wedge 206.

At step 306, a second retention wedge 206 is positioned within a second channel 218 of the rotor core 202, the second retention wedge 206 engaging at least a side of the magnets 208 that is opposite to the side of the magnets 208 that is engaged by the first retention wedge 206. More specifically, the second retention wedge 206 is inserted into a channel 218 of the rotor core 202 such that a second engagement surface 250b of the second retention wedge 206 engages the second engagement walls 232b of the magnets 208 and the second shield engagement walls 242b of the eddy current shields 220. According to certain embodiments, the insertion of the second retention wedge 206 at step 306 may include pressing with a press, or otherwise driving, the second retention wedge 206 into the channel 218 so that at least the second wedge engagement surface 250b of the second retention wedge 206 at least partially deforms to provide an interference or press fit with the magnets 208. Such press fitting may also cause the first engagement surface 250a of the first retention wedge 206 to deform, as the force exert upon at least the first engagement walls 232a of the magnets 208 by the first retention wedge 206 may also be increased as a consequence of establishing the press fitting or interference engagement between the second retention wedge 206 and the magnets 208.

Steps 302-306 may then be repeated as magnets 208 are secured at other locations about the outer surface 214 of the rotor core 202. Alternatively, according to other embodiments, magnets 208 and the associated eddy current shields 220, if any, may be initially secured about the rotor core 202 via use of a fixture, such as, for example, a magnetic fixture, before the corresponding retention wedges 206 are inserted into the channels 218. At step 308, after fixation of the magnets 208 to the rotor core 202, the outer walls 228 of the magnets 208, and/or the outer shield surfaces 238b of the eddy current shields 220, may be machined, if needed, such as, for example, to at least attempt to attain or enhance the roundness or concentricity of the rotor 200. For example, according to certain embodiments, such machining may include grinding of the assembled rotor 200.

Figure 9:
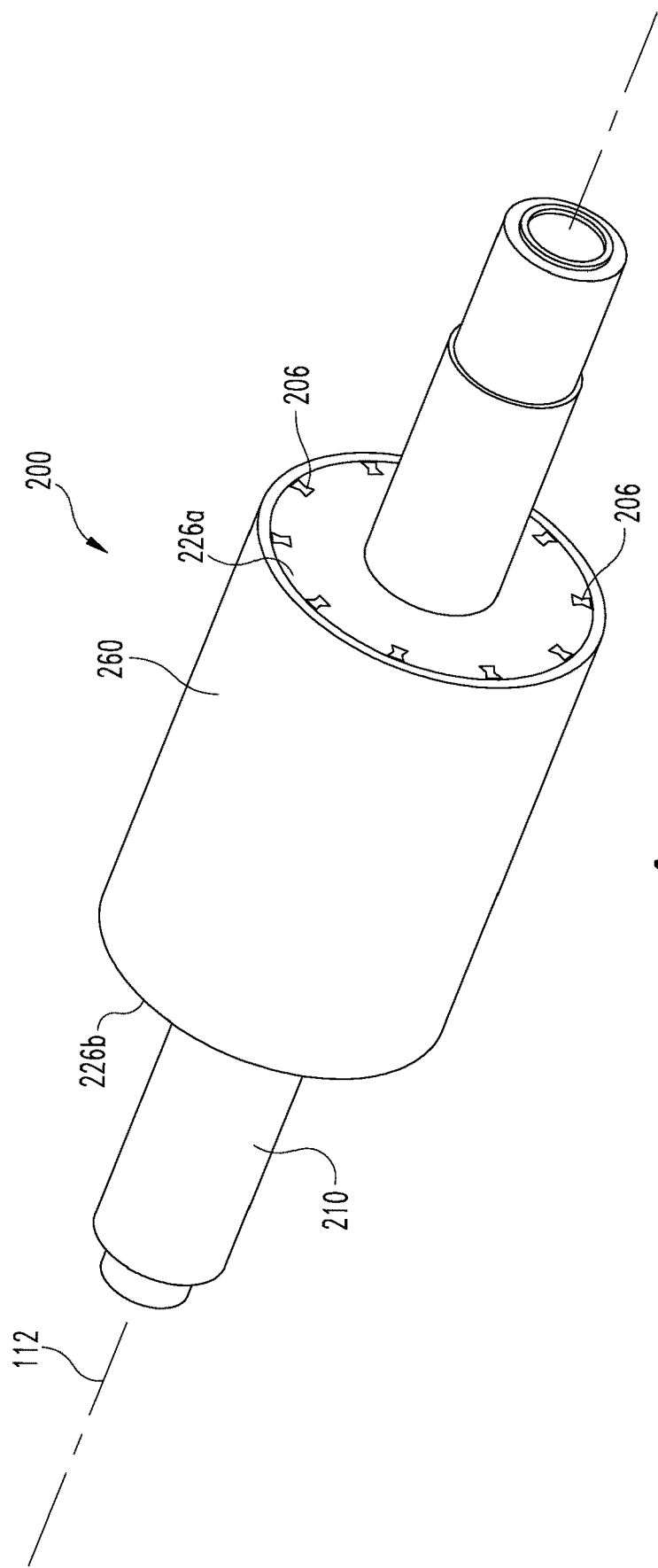
FIG. 9 illustrates an embodiment of a sleeve press fitted onto end walls.

Optionally, according to certain high speed applications, and as shown in FIG. 7, the fixation system 204 may also include a magnet fixation or pressure sleeve 260 that may be shrink fitted over the magnets 208. According to certain embodiments, the magnet fixation or pressure sleeve 260 may exert a radially inwardly force against the magnets 208. Further, the magnet fixation or pressure sleeve 260 may be constructed from a variety of different types of materials, including, for example, materials that have a relatively high modulus of elasticity and strength, such as, for example, a high modulus carbon fiber or Inconel steel or alloy, among other materials. Further, as shown in FIG. 7, according to certain embodiments, the rotor core 202 and/or various components of the fixation system 202, including the magnet fixation sleeve 260, for example, may be sized to prevent the magnet fixation sleeve 260 from having direct contact with the retention wedges 206. For example, as shown in FIG. 7, according to certain embodiments, the outer wall 228b of the magnets 208 may extend further from the outer surface 214 of the rotor core 202 than the outer wedge wall 252 such that the inner surface 262 of the magnet fixation or pressure sleeve 260 is in direct contact with the magnets 208 but is separated from the outer wedge wall 252 of the retention wedges 206 by a space 264. Thus, according to embodiments that include the magnet fixation or pressure sleeve 260, at step 310, at least a portion of the rotor 200 may be shrunk, such as, for example, by a reduction of the temperature of the rotor 200 via exposure to liquid nitrogen, while at least the inner surface 262 of the magnet fixation or pressure sleeve 260 is increased so that the sleeve 260. Such adjustments in the sizes of the rotor 200 and the magnet fixation or pressure sleeve 260 may allow for the magnet fixation or pressure sleeve 260 to be shrink fitted over the rotor 200. Thus, at step 312, with the size of the rotor 200 reduced, and the size of the inner surface 262 of the magnet fixation or pressure sleeve 260 increased, the magnet fixation or pressure sleeve 260 may be placed over at least a portion of the rotor core 202 and/or the magnets 208 so that a press fit is attained as the temperatures of the rotor 200 and magnet fixation or pressure sleeve 260 generally normalize. FIG. 9 depicts an embodiment of a sleeve 260 press fit onto at least the first and second end walls 226a, 226b.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. An apparatus comprising:
at least one pair of retention wedges positioned adjacent to opposing sides of one or more magnets, the at least one pair of retention wedges secured to a rotor core, the at least one pair of retention wedges exerting a force against opposing sides of the one or more magnets to retain a position of the one or more magnets about the rotor core; and
a magnet pressure sleeve positioned radially outwardly of, and against, the one or more magnets and separated from the at least one pair of retention wedges by a space, the magnet pressure sleeve shrink fit about the one or more magnets such that a hoop stress is formed in the magnet pressure sleeve and imparts circumferential stress throughout a material thickness of the magnet pressure sleeve;
wherein the magnet pressure sleeve is a carbon fiber pressure sleeve having a thermal insulative property, further including a plurality of eddy current shields, each of the plurality of eddy current shields positioned adjacent the one or more magnets, wherein the at least one pair of retention wedges and the plurality of eddy current shields are made from aluminum, and wherein a heat flow path from the rotor core interior of the magnet pressure sleeve extends through the plurality of eddy current shields, to the retention wedges, and outward toward a first axial end and a second axial end of the rotor core.

2. The apparatus of claim 1, wherein the at least one pair of retention wedges are constructed from a non-magnetic, electrically conductive material.

3. The apparatus of claim 2, wherein the at least one pair of retention wedges and the one or more magnets are structured to engage in a press fit that facilitates the retention of the radial position of the one or more magnets.

4. The apparatus of claim 3, wherein the at least one pair of retention wedges exerts a force against the plurality of eddy current shields to retain a radial position of the plurality of eddy current shields relative to the rotor core.

5. The apparatus of claim 4, wherein the plurality of eddy current shields and the magnet pressure sleeve are constructed from a non-magnetic, electrically conductive material.

6. An apparatus comprising:
a rotor including a rotor core, one or more magnets, and a plurality of channels, the one or more magnets positioned about at least a portion of an outer surface of the rotor core, the plurality of channels extending axially through at least a portion of the rotor core;
a plurality of retention wedges secured within the plurality of channels, an engagement section of the plurality of retention wedges projecting away from the plurality of channels through one or more openings in the outer surface of the rotor core, the engagement section exerting a force against the one or more magnets to retain a position of the one or more magnets about the rotor core; and
a magnet pressure sleeve secured to the rotor core and positioned radially outwardly of, and against, the one or more magnets and free from direct contact with the plurality of retention wedges, the magnet pressure sleeve being of a unitary construction capable of being shrink fit about the one or more magnets where such shrink fit assembly imparts wall tension throughout a material thickness of the unitary construction;
wherein the magnet pressure sleeve is a carbon fiber pressure sleeve having a thermal insulative property, wherein the rotor further includes a plurality of eddy current shields, the plurality of eddy current shields being positioned between adjacent pairs of the one or more magnets, wherein the at least one pair of retention wedges and the plurality of eddy current shields are made from aluminum, and wherein a heat flow path from the rotor core interior of the magnet pressure sleeve extends through the plurality of eddy current shields, to the retention wedges, and outward toward a first axial end and a second axial end of the rotor core.

7. The apparatus of claim 6, wherein an inner surface of the magnet pressure sleeve is separated from an outer wedge wall of the plurality of retention wedges.

8. The apparatus of claim 7, wherein the plurality of retention wedges are constructed from a non-magnetic, electrically conductive material.

9. The apparatus of claim 8, wherein the engagement section of the plurality of retention wedges exerts a force against the plurality of eddy current shields to retain a position of the plurality of eddy current shields on the rotor core.

10. The apparatus of claim 9, wherein the plurality of eddy current shields and the magnet pressure sleeve are constructed from a non-magnetic, electrically conductive material.

11. An apparatus comprising:
- a plurality of permanent magnets having a first engagement wall, a second engagement wall, an inner wall, and an outer wall, the inner and outer walls being on opposing sides of each magnet of the plurality of magnets, at least a portion of the inner wall abutting against an outer surface of a rotor core;
- a first retention wedge having a first engagement portion and a second engagement portion, the second engagement portion of the first retention wedge secured within an axially extending first channel of the rotor core, the first engagement portion of the first retention wedge extending to an outer wedge wall of the first retention wedge and exerting a pressing force against the first engagement wall of the plurality of permanent magnets;
- a second retention wedge having a first engagement portion and a second engagement portion, the second engagement portion of the second retention wedge secured within an axially extending second channel of the rotor core, the first engagement portion of the second retention wedge extending to an outer wedge wall of the second retention wedge and exerting a pressing force against the second engagement wall of the plurality of permanent magnets; and
- a magnet pressure sleeve constructed as a unitary sleeve and with a material composition structured to be shrink fit about the plurality of permanent magnets, the unitary sleeve having a hoop stress throughout as a result of the magnet pressure sleeve being shrink fit about the plurality of permanent magnets;
- wherein the outer wedge walls of the first and second retention wedges are separated from the rotor core by a radial distance that is less than a radial distance separating the outer surface of the plurality of permanent magnets and the rotor core;
- wherein the magnet pressure sleeve is a carbon fiber pressure sleeve having a thermal insulative property, further including a plurality of eddy current shields, each of the plurality of eddy current shields being positioned between adjacent pairs of the plurality of permanent magnets, wherein the at least one pair of retention wedges and the plurality of eddy current shields are made from aluminum, and wherein a heat flow path from the rotor core interior of the magnet pressure sleeve extends through the plurality of eddy current shields, to the retention wedges, and outward toward a first axial end and a second axial end of the rotor core.

12. The apparatus of claim 11, wherein the first engagement portions of the first and second retention wedges exert a pressing force against the plurality of eddy current shields to retain a position of the plurality of eddy current shields on the rotor core.

13. The apparatus of claim 12, wherein the magnet pressure sleeve secured to the rotor core and positioned radially outwardly of, and against, the outer surface of the plurality of permanent magnets and separated from the outer wedge walls of the first and second retention wedges by a space.

14. The apparatus of claim 13, wherein the plurality of eddy current shields, the first and second retention wedges, and the magnet pressure sleeve are each constructed from a non-magnetic, electrically conductive material.

* * * * *